United States Patent
Cudd et al.

(10) Patent No.: US 7,099,927 B2
(45) Date of Patent: *Aug. 29, 2006

(54) DOWNLOADING AND UPLOADING DATA IN INFORMATION NETWORKS USING PROXY SERVER CLIENTS

(75) Inventors: Richard Cudd, London (GB); Matthew A. Ward, London (GB); Roderick J. M. Macleod, London (GB); Michael Waller, London (GB)

(73) Assignee: NCR Corporation, Dayton, OH (US)

( * ) Notice: Subject to any disclaimer, the term of this patent is extended or adjusted under 35 U.S.C. 154(b) by 745 days.

This patent is subject to a terminal disclaimer.

(21) Appl. No.: 09/943,118

(22) Filed: Aug. 30, 2001
(Under 37 CFR 1.47)

(65) Prior Publication Data
US 2002/0198993 A1 Dec. 26, 2002

(30) Foreign Application Priority Data
Sep. 1, 2000 (GB) .................. 0021372.8

(51) Int. Cl.
*G06F 15/16* (2006.01)
*G06F 15/173* (2006.01)
(52) U.S. Cl. ............... 709/217; 709/218; 709/219; 709/223; 709/224; 709/225
(58) Field of Classification Search ........... 709/203, 709/212, 213, 214, 216, 217, 219, 205, 234, 709/236, 201, 218, 224, 225; 707/1; 711/3, 711/118, 130, 119
See application file for complete search history.

(56) References Cited

U.S. PATENT DOCUMENTS 5,864,854 A * 1/1999 Boyle .................. 707/10
5,991,810 A * 11/1999 Shapiro et al. ............ 709/229
6,112,228 A * 8/2000 Earl et al. ................. 709/205
6,199,147 B1 * 3/2001 Smith et al. ............... 711/156
6,300,863 B1 * 10/2001 Cotichini et al. .......... 340/5.8
6,446,121 B1 * 9/2002 Shah et al. ................ 709/224
6,505,254 B1 * 1/2003 Johnson et al. ............ 709/239
6,618,752 B1 * 9/2003 Moore et al. .............. 709/217
6,629,138 B1 * 9/2003 Lambert et al. ........... 709/224
6,768,743 B1 * 7/2004 Borella et al. ............. 370/401

(Continued)

FOREIGN PATENT DOCUMENTS

EP 0877326 11/1998

(Continued)

OTHER PUBLICATIONS

Jeffery et al., Emerging Technologies and Applications in Communications, published 1996, IEEE, pp. 116-119, "Proxy-sharing proxy servers".

(Continued)

*Primary Examiner*—Jeffrey Pwu
(74) *Attorney, Agent, or Firm*—Michael Chan

(57) ABSTRACT

A method of downloading or uploading data via a client-server communications network, which network comprises a plurality of clients (A, B, 8, 9, 10) each having a local cache storing data downloaded via the network. The method comprises responding to a data request made to the network by a first client (A, 8) by uploading data from the cache of a second client (B, 9, 10) and transmitting that data across the network to the first client (A, 8). Also disclosed are client-server networks operating in accordance with the method and to the related servers (3), client terminals (A, B, 8, 9, 10), browsers loaded on client terminals, and plug-ins for such terminals and browsers.

25 Claims, 3 Drawing Sheets

U.S. PATENT DOCUMENTS

| | | | |
|---|---|---|---|
| 2002/0046348 A1* | 4/2002 | Brustoloni | 713/201 |
| 2003/0061353 A1* | 3/2003 | Johnson et al. | 709/226 |
| 2003/0149737 A1* | 8/2003 | Lambert et al. | 709/214 |
| 2004/0044740 A1* | 3/2004 | Cudd et al. | 709/217 |

FOREIGN PATENT DOCUMENTS

| | | |
|---|---|---|
| WO | 0022526 | 4/2000 |
| WO | 0079362 | 12/2000 |

OTHER PUBLICATIONS

Fan et al., IEEE/ACM Transactions on Networking, published Jun. 2000, pp. 281-293, "Summery cache: a scalable wide-area Web cache sharing protocol".

Inamura, H., Reliable Distributed Systems, published 1998, IEEE, pp. 336-340, "Extending the Coda File System to handle cache misses on isolated clients".

Pu et al., High Performance Distributed Computing, published 1992, IEEE, pp. 218-227, "Performance comparison of active-sender and active-reader policies for distributed caching".

* cited by examiner

A CLIENT REQUEST TO A SERVER

CLIENT REQUEST VIA A PROXY SERVER

DOWNLOADING AND UPLOADING DATA IN INFORMATION NETWORKS USING PROXY SERVER CLIENTS

BACKGROUND OF THE INVENTION

This invention relates to downloading data from or uploading data to information sources via information networks and, in preferred embodiments, relates to techniques for retrieving files such as web pages and other web content in an Internet environment.

Currently, the Internet operates under the hypertext transfer protocol (HTTP) and embodies a client-server architecture. The vast majority of Internet access—about 99%—is achieved via web browser programs, predominantly Netscape or Microsoft Internet Explorer, whose trade marks are acknowledged.

Existing download techniques will be discussed later with reference to FIGS. 1(a) and 1(b) but, typically, the client is a user's terminal such as a PC, a suitably-adapted (e.g. Wireless Access Protocol or WAP) mobile telephone or other communications device running a browser program. This terminal downloads and displays a desired HTML web page held on a web server by using a communications network to send a request for that web page across the Internet to the appropriate server. The server responds by sending the requested web page back across the Internet and from there to the client via the communications network to which the user's terminal is connected.

Whilst a web page is mentioned by way of example, other web content files such as .gif, .jpg or .mpg files can be downloaded in the same way.

The client and server can be in direct contact across the Internet via the communications network or can be connected via a proxy server acting between the client and the server. The purpose of the proxy server is to cache some web pages, usually as a result of previous user requests, so that future user requests for the cached web pages can be satisfied without connecting to the server. If the user requests a web page that is not cached on the proxy server, the proxy server forwards the request to the server and receives and forwards the requested page from the server to the client. However, in general, less traffic needs to connect to the server and so the average download time is decreased.

Cache techniques are, of course, commonplace in the Internet art. Most commonly, when a server or a proxy server responds to a user's request by sending a web page back to the client, that page may be cached on the user's terminal so that future user requests for the same web page can be satisfied immediately without having to connect to the server or the proxy server at all. Nevertheless, the user's terminal cannot cache every page that the user ever downloads, and the user will naturally wish to update cached web pages and to download new web pages from time to time. This means that efficient downloading remains paramount.

Despite ongoing efforts to speed Internet usage with faster modems and high-speed network technologies such as ADSL and optical cable, the majority of Internet users are burdened with slow download times. Even if an Internet user invests heavily in a fast modem and in subscribing to a high-speed communications network, the user may still suffer delays due to the architecture of the Internet itself and the nature of its components. Particular problems arise due to the limited speed with which servers can operate and the restricted bandwidth of the numerous communications channels that lie between the server and the client. There is also the problem of unreliability, meaning that if a server is down and no cached copy of the desired web page is accessible elsewhere, the user may have to wait until the server is operational again.

The slowness and unreliability of downloads makes the Internet less useful and appealing than it could and should be, to the detriment of users and also those who seek to provide information to users. Recent research suggests that, on average, a user will wait just eight seconds for a web page to download before moving on elsewhere. If that happens, the user misses information that could have been beneficial and the provider of the web page misses an opportunity to convey that information, possibly resulting in lost business and decreased advertising revenues. The problem is likely to get worse until efforts to upgrade the Internet and its associated communications technologies begin to outweigh the explosion of new Internet users and the move towards 'always-on' Internet access.

SUMMARY OF THE INVENTION

Broadly, this invention contemplates a method of downloading data via a client-server communications network, which network comprises a plurality of clients each having a local cache storing data downloaded via the network. The method comprises responding to a data request made to the network by a first client by uploading data from the cache of a second client and transmitting that data across the network to the first client.

In use of a first architecture, the invention may be defined as a method of downloading or uploading data via a client-server communications network that includes a server and a plurality of clients, each client having a local cache storing data downloaded via the network, the method comprising a requesting client (8) sending a request for data to the server, and the server responding by sending the requested data to the requesting client (8) or referring the requesting client (8) to a proxy server client that holds the requested data in its local cache, the requesting client (8) then downloading the requested data from the cache of the proxy server client across the network.

This first architecture is embodied in a client-server communications network including a server and a plurality of clients, each client having a local cache storing data downloaded via the network and the server having means for responding to a client that sends a data request to the server, wherein the server is adapted to send the requested data to the requesting client (8) or to refer the requesting client (8) to a proxy server client that holds the requested data in its local cache.

The server of the first architecture includes means for responding to a client that sends a data request to the server and is adapted to send the requested data to the requesting client or to refer the requesting client to a proxy server client that holds the requested data in a local cache of data downloaded via the network. The first architecture also involves a client terminal for connection to a server, or a browser for such a client terminal, including selection means for choosing between a plurality of proxy server clients if the server is unable to respond to a data request from the client within a target period or at all, and means for downloading the requested data from a chosen proxy server client.

In use of a second architecture, the invention may be defined as a method of downloading or uploading data via a client-server communications network that includes a server and a plurality of clients, each client having a local cache storing data downloaded via the network, the method comprising a requesting client broadcasting a data request over the network to the server and/or one or more other clients or connecting to at least one client whose address is on a proxy list held by the requesting client, the requesting client then downloading the requested data across the network from the cache of a proxy server client that is caching the requested data.

This second architecture is embodied in a client-server communications network including a server and a plurality of clients, each client having a local cache storing data downloaded via the network, wherein a requesting client is adapted to broadcast a data request over the network to the server and/or one or more other clients or to connect to at least one client whose address is on a proxy list held by the requesting client, and includes means for downloading the requested data across the network from the cache of a proxy server client that is caching the requested data.

The second architecture involves a client terminal for connection to a server, or a browser for such a client terminal, including selection means for choosing among a plurality of proxy server clients the proxy server client from which it will download the requested data, and means for downloading the requested data from a chosen proxy server client.

In an Internet context, the network is the Internet, the clients are user terminals running web browsers and the respective local caches are associated with the browsers on the user terminals that act as proxy server clients. The invention capitalizes upon the facts that (i) the vast majority of Internet access is done through web browsers that have become a de facto standard, such as Netscape and Microsoft Internet Explorer and (ii) those millions of web browsers cache a great deal of information about the web sites that people most often look at.

A key advantage of the invention, in preferred embodiments, is that it can be deployed and propagated among a large number of users as a plug-in for their existing browsers. So, whilst a simple module would have to be added to the server, users would not have to install completely new browsers but instead could upgrade their existing systems using simple download techniques with which most users are familiar. The invention therefore extends to software plug-ins for a client terminal or for a browser loaded on that client terminal and being programmed to adapt a terminal or a browser in accordance with the invention.

BRIEF DESCRIPTION OF THE DRAWINGS

In order that this invention can be more readily understood, reference will now be made, by way of example, to the accompanying drawings in which.

DETAILED DESCRIPTION

Figure 1A:
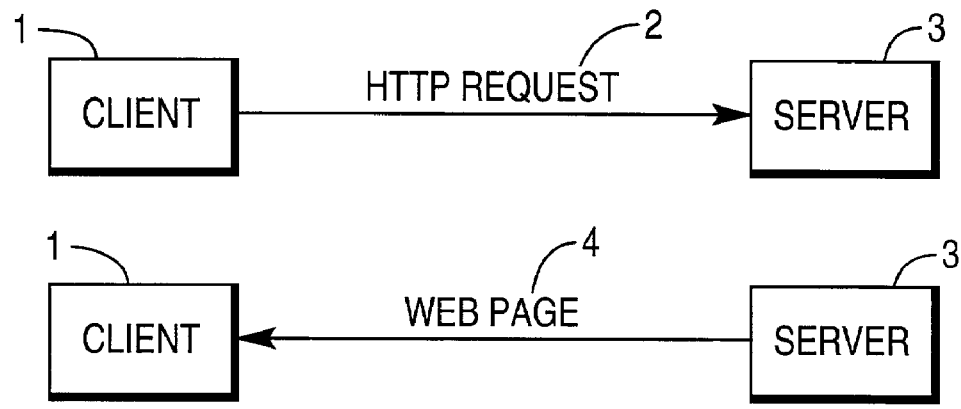
FIG. 1(a) and FIG. 1(b) are block diagrams showing existing ways in which a web page may be downloaded via the Internet, FIG. 1(a) showing a simple client-server architecture and FIG. 1(b) showing a variant in which a proxy server acts between the client and the server.

In the simplest existing client-server architecture of FIG. 1(a), a client 1 such as a PC running a browser makes an HTTP request 2 for a particular downloadable file to the server 3 and the server 3 responds by sending the requested file to the client 1. The file could, for example, be an HTML web page 4, a .gif, .jpg or .mpg file, or other web content. Web pages will be used as an example of such files throughout the description that follows.

Figure 1B:
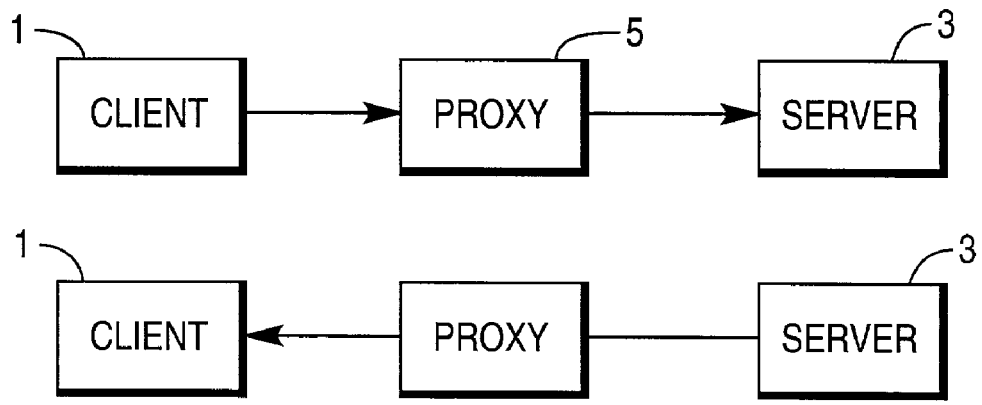

FIG. 1(b) shows a variant in which a proxy server 5 acts between the client 1 and the server 3 to speed the average download time by reducing traffic connecting to the server 3. The client 1 makes an HTTP request for a particular web page via the proxy server 5. The proxy server 5 may have a cached copy of the requested web page as a result of a previous request for that web page. If it does, then it returns that cached web page to the client 1, without connecting to the server 3. If not, the proxy server 5 requests and downloads the requested web page from the server 3, forwards it to the client 1 and advantageously keeps a copy in its cache in case a client 1 requests that page in the future.

In both of the above variants, the client 1 may cache a downloaded web page so that if a user requests the same page in future, it is not necessary to download that web page again from either a server 3 or a proxy server 5. However, the user may set the browser so that when a web page in cache is requested, the cached web page is compared to the corresponding web page then available from the server 3 or the proxy server 5. If there is a difference between the ostensibly corresponding web pages, the latest version of the web page can be downloaded, displayed and cached in place of the previous version.

Figure 2:
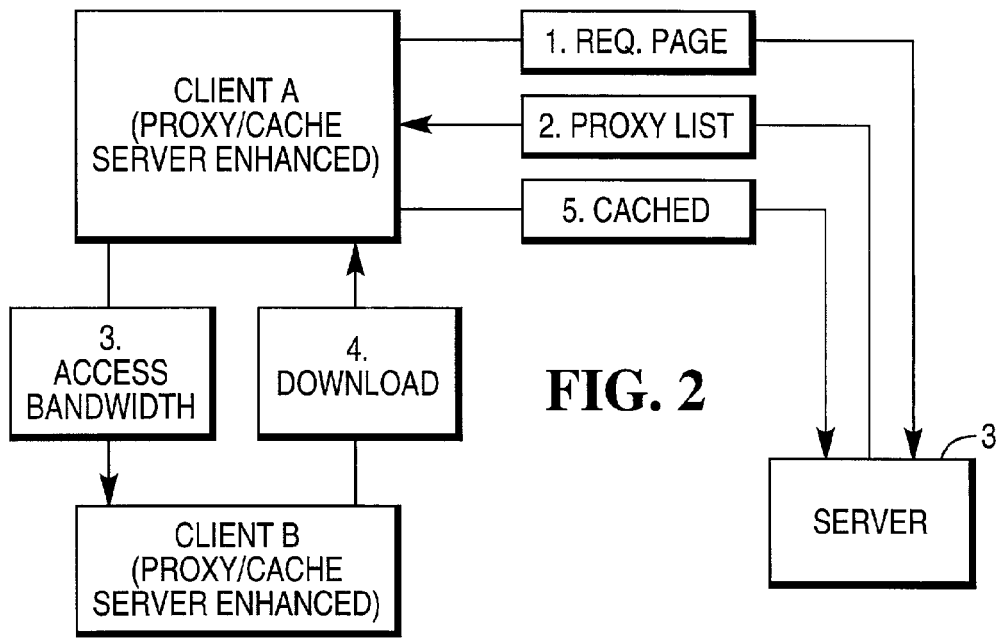
FIG. 2 is a block diagram showing how, in a preferred embodiment of the invention, a web page can be downloaded by one client from another client.

Referring now to FIG. 2 which illustrates a preferred embodiment of the invention, two clients, Client A and Client B, can access a server 3 via the Internet. There would of course be many more clients in practice, but just two clients are necessary to illustrate the broad inventive concept. Both Client A and Client B run browsers that have been enhanced in accordance with the invention, preferably by downloading and executing a suitable plug-in on the respective client terminals.

In the manner of the prior art, each respective terminal of Client A and Client B holds web pages in cache as a result of previous downloads. However, by virtue of the invention, the enhanced browsers open the caches of their respective client terminals for access by other network users. So, as the client terminals can act like proxy servers, the entire network can offer faster and more reliable downloads. In effect, the invention creates a network in which there are almost as many proxy servers as there are clients. These clients that emulate proxy servers will be referred to herein as proxy server clients.

In the embodiment of FIG. 2, each proxy server client reports its cached web pages to the server 3 so that the server 3 can store in a look-up table the client location(s) at which a particular web page is cached. In use, a user at Client A requests a web page from the server 3 with an HTTP request in the usual way. The server 3 either fulfils that request or, if it cannot fulfil the request quickly enough, looks up where else that web page is cached and responds to Client A with a short acknowledgement that points the browser of Client A to the appropriate proxy server client location. As will be explained, the acknowledgement to the requesting client can be little more than a list of IP addresses constituting a proxy list of clients to identify the proxy server client terminal(s) at which the requested web page is cached.

If the server 3 tells Client A that the web page requested by Client A is cached at Client B, then Client A contacts Client B and downloads that web page from the cache in the client terminal of Client B. Preferably, however, Client A firstly assesses and compares the bandwidths available at that time in the connections between itself and the server 3 on the one hand and between itself and Client B on the other hand. The aim is to determine which of the available connections would be the faster to use, and then to select that connection so as to minimize download times and maximize the efficient use of network resources.

In FIG. 2, the bandwidth available between Client A and Client B has been assessed as being greater than the bandwidth available between Client A and the server 3, so Client A requests the desired web page from the cache of Client B. However, if the bandwidth comparison was instead in favor of the connection between Client A and the server 3, that connection would be used to download the web page from the server 3 instead of from Client B.

By extension, the technique of comparing bandwidths can be applied to the connections between Client A and proxy server clients other than Client B. So, if the desired web page is cached at other network resources such as other clients, the web page can be downloaded from one of those other resources if it would be more efficient, bandwidth-wise, to do so than to download the same web page from either Client B or the server 3.

Figure 3:
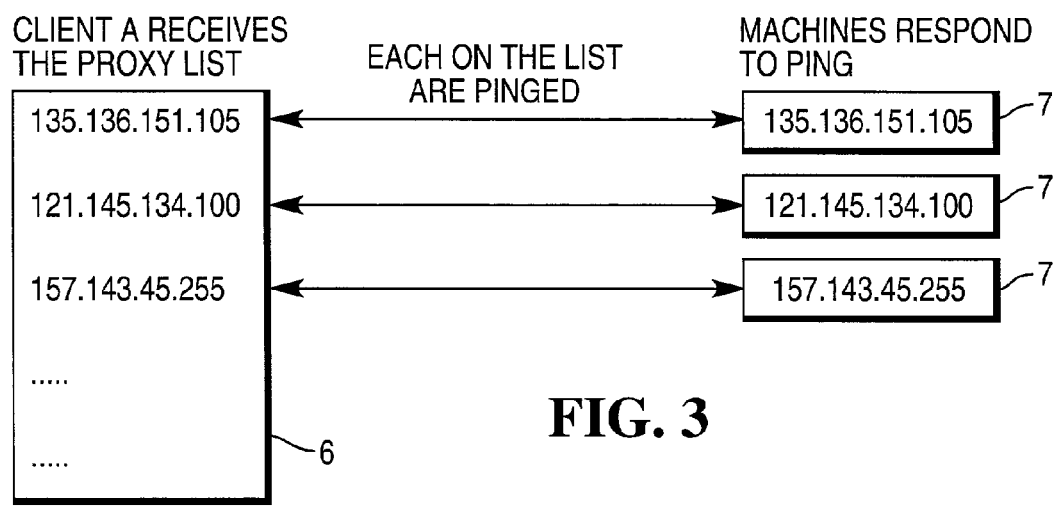
FIG. 3 is a block diagram showing how the bandwidths of connections between various clients can be compared.

The principle of resource selection is shown in FIG. 3, in which Client A has received a proxy list 6 of client IP addresses 7 from the server and then assesses the speed of the connection to each of the proxy server clients identified by the proxy list 6. This is done by a simple PING (Packet INternet Groper) operation that attempts to contact each specified IP address 7 and returns the times taken to connect to the terminals at those addresses 7. Specifically, a PING utility sends a packet to each IP address 7 and waits for, and times, the reply from each address 7. It will be noted that Client A performs the PING operation rather than the server 3 because it is the connections between respective clients that matter in this context, not the connections between the server 3 and its clients.

The response times from each pinged proxy server client are recorded by Client A so that, once an appropriate number of proxy server clients have been pinged, Client A can compare the recorded response times and select the proxy server client with the fastest response for the purpose of downloading the desired web page. It is also possible for a target response time to be set and for Client A to select from the first pinged proxy server client to meet that target. This saves Client A continuing the process of pinging all of the proxy server clients on the proxy list when it has already found a proxy server client whose response time meets the target and so is deemed to be adequate.

It will be apparent that the pinging process set out in FIG. 3 is preceded by an assessment of whether it is faster to download the desired web page directly from the server 3 or to download from one of the proxy server clients that are caching the desired web page. This assessment can be done in various ways. In a first technique, for example, the server 3 may initially attempt to respond with the desired web page but if it cannot respond within a predetermined period deemed to be acceptably quick, it instead responds with the aforementioned proxy list and leaves the requesting client to find and download the desired web page from another client. This has the advantage that if the server 3 can respond and upload the desired web page to the requesting client quickly enough, there is no need to go through the delay of pinging other clients at which the desired web page is cached.

The predetermined period in which the server 3 is challenged to respond need not be a fixed period of time: that period could change dynamically in accordance with the average download time for the requesting client terminal concerned. Clearly, all else being equal, a client terminal connected to the Internet via an ordinary 56 k modem will expect slower downloads than a terminal using a modem that can exploit a 128 k ISDN or ADSL connection. In those circumstances, it is appropriate that the server 3 senses the speed of the connection from the requesting client and responds to the sensed speed by tailoring the predetermined period accordingly Specifically, the server 3 should shorten the predetermined period when the connection is relatively fast, and should lengthen that period when the connection is relatively slow.

A second technique for assessing the speed of server response involves the server 3 invariably and immediately responding to web page requests with a proxy list 6 but including in that proxy list 6 the IP address of the server 3 itself. As a result, the server 3 is treated like the other resources (i.e. proxy server clients) identified by the proxy list 6 and so will be pinged along with the proxy server clients identified by that list. If the server 3 happens to be the fastest resource to respond, or if it is the first resource to respond within a predetermined target time, then the desired web page is downloaded from the server 3. Otherwise, the desired web page is downloaded from a proxy server client whose response is found to be fastest among the various resources identified by the proxy list 6 or whose response time is the first to meet the target.

This second assessment technique is currently less preferred than the first assessment technique because although it is more elegant in terms of architecture, it incurs the overhead of downloading the proxy list 6 from the server 3 and then pinging the IP addresses 7 on that list.

The various proxy server client locations, expressed as their respective IP addresses, can be stored on the server 3 as simple text files and a proxy list file is associated with every web page in the look-up table held on the server. The size of the proxy list file should obviously be kept within reasonable bounds, for example limited to a maximum of twenty IP addresses for each web page. This is due to considerations of memory capacity and download time but also has implications for efficient bandwidth assessment, in which it is desirable not to ping too many client terminals.

Figure 4:
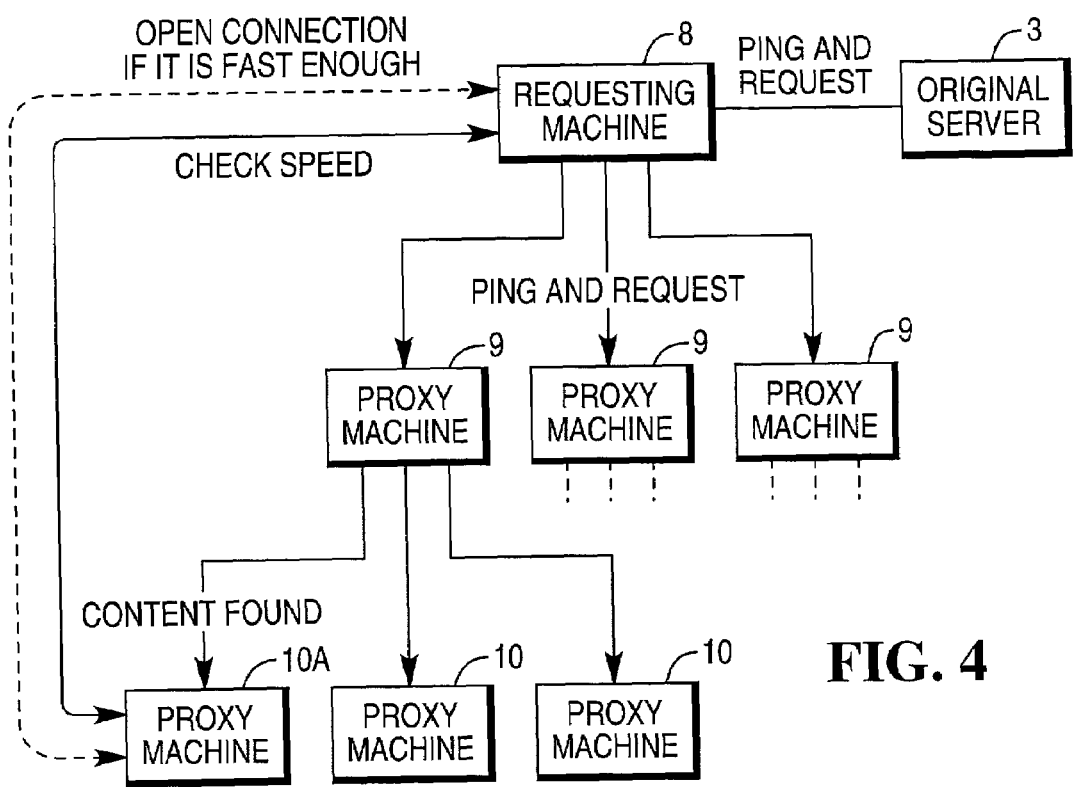
FIG. 4 is a block diagram of a second embodiment of the invention that can be used in isolation or, preferably, as a fall-back for the preferred embodiment.

Another approach of the invention is shown in FIG. 4, in which a client 8 making a web page request holds a proxy list of IP addresses defining a server 3 and also a group of other clients 9. The request is made to the IP addresses in the proxy list, so being made to the server 3 in the normal way but also being broadcast to the group of other proxy server clients 9, to inquire as to whether they hold any of the requested information in cache. If they do, they can report back to the requesting client 8 and the web page can then be downloaded by that client 8 from any of the proxy server clients 9 that are caching the requested web page. Each of the client terminals on the proxy list may in turn be connected to other proxy server client terminals 10 to which they can forward the request, thus forming the chain or tree structure shown in simplified form in FIG. 4.

In the FIG. 4 approach, the server 3 is not relied upon to return a list of proxy terminals. The requesting client terminal merely needs to have the IP address of one, or the IP addresses of a few, of the proxy server client terminals 9 for the chain or tree to begin. The necessary IP address(es) could be downloaded from a web site or distributed with software.

It would also be possible to broadcast a short request over the network to make an initial connection with a proxy server client terminal 9 that has the requested web page in cache and responds to the broadcast. This operation would only need to be performed once since the IP address of the responding proxy server client terminal could then be stored by the requesting client terminal for later use.

An advantage of the approach of FIG. 4 is that it is possible to find web pages even when the server 3 is down. It could thus be a fall-back to the architecture of FIG. 2, to be used only when there is no response from the original server in operation of the FIG. 2 embodiment.

If appropriate, the choice between potential proxy server client sources 9 of the cached web page can be made after the above-mentioned bandwidth comparison between the various connections to those proxy server clients 9. As before, this involves pinging all the proxy server client terminals 9 on the proxy list, including the server 3, and downloading via the fastest connection.

Again, a decision is required about whether to ping each IP address on the proxy list held by the requesting client 8, or simply to download the web page from the server 3. If the FIG. 4 architecture is used as a fall back, then a timeout can be set so that if no response has been received from the server 3 after a predetermined (but not necessarily fixed) period of time, then the chain or tree process is followed.

Another issue with pinging through a chain or tree structure is that each proxy server client terminal 9 at each level of the structure will ping to proxy server client terminals 10 in the next level of the structure. So, the originally-requesting client terminal 8 will not necessarily ping directly to the potential source of the requested web page if that source is more than one level down the structure. In those circumstances, it is necessary to add another step into the process to check the speed between the originally-requesting client terminal 8 and the potential source 10A, as shown in FIG. 4, to be sure that there is a fast connection for downloading from the potential source 10A.

In all cases, a client advantageously reports to the server 3 upon downloading and caching a web page retrieved from cache among proxy server clients. In this way, the server can add that proxy server client location to its look-up table as a further potential source of that web page. It is similarly advantageous that a proxy server client reports to the server 3 removal of a web page from its cache, for example during a routine automated cache clean-up or in response to a user command. The server 3 can therefore delete that web page location from its look-up table and so knows to point requesting clients elsewhere if they request the deleted web page.

The invention requires extra messaging but it is expected that, in most practical cases, the overhead of that extra messaging in terms of download time would still allow shorter aggregate download times than can be achieved directly from the server.

The inventors recognize the need to ensure that no proxy server clients are overloaded with incoming requests, broadcasts and the resulting uploads, as this would unacceptably reduce the bandwidth available to those clients for other, unrelated communications. Accordingly, the invention contemplates means for monitoring the proxy workload of proxy server clients and preventing overload. This can be achieved at the client end by refusing to serve certain requests over a specified workload limit, and/or at the server end by omitting an overloaded proxy server client from the proxy lists sent in response to requests from other clients. Also, in the embodiment of FIG. 4, the invention contemplates limiting the number of proxy server clients in the group of clients that are polled and, possibly, changing the members of that group from request to request.

Many other variations are possible within the inventive concept. For example, the server in the FIG. 2 embodiment can periodically update the look-up table from which the proxy lists are derived so to ensure that the lists are optimal. This can be achieved by pinging the IP addresses in the table from time to time, comparing their response times and discarding the slowest for a given item of data or those that fail to meet a target threshold. A possible problem with this approach is that the connection between a server and a proxy server client does not equate to the connection between one client and another client, so the server is not always best placed to assess client-client bandwidth. Another and possibly better approach is that when a client reports to the server upon downloading and caching a web page received from a resource such as a proxy server client, that client tells the server the IP address of the proxy server client that provided the web page. The server can therefore assemble a list of the most commonly accessed and hence fastest resources and can discard the less commonly accessed and hence slowest resources, like a voting scheme in which only those resources proven by various requesting clients to be fastest will continue to survive in the proxy lists held by the server.

The present invention may be embodied in other specific forms without departing from its essential attributes. Accordingly, reference should be made to the appended claims rather than to the foregoing specific description as indicating the scope of the invention.

What is claimed is:

1. A method of a server downloading data via a client-server communications network, the method comprising:
   receiving a request for data from a client;
   determining if the request for data can be fulfilled by the server within a predetermined target period, wherein the predetermined target period varies as a function of a speed of connection with the requesting client; and
   sending to the client a proxy list comprising an address of at least one proxy server client which stores requested data in a local cache if the request for data is unable to be fulfilled by the server within the predetermined target period.

2. A method according to claim 1, wherein the predetermined target period is shortened when the speed of connection is relatively fast and lengthened when the client speed of connection is relatively slow.

3. A method according to claim 1, further comprising maintaining a look-up table which correlates items of data with addresses of one or more proxy server clients at which the items of data are cached.

4. A method according to claim 3, further comprising:
   receiving cache status change reports from the one or more proxy server clients at which the items of data are cached; and
   updating the look-up table using the cache status change reports.

5. A method according to claim 3, further comprising:
   assessing connection speeds to the one or more proxy server clients whose addresses are contained in the look-up table; and
   discarding or demoting the addresses of proxy server clients failing to meet a target connection speed.

6. A method according to claim 1, further comprising:
receiving an address of a proxy server client that provided requested data; and
assembling an address list of proxy server clients most commonly accessed to obtain requested data.

7. A method according to claim 1, wherein the proxy list comprises addresses of proxy server clients whose workload is below a workload limit.

8. A method according to claim 1, wherein the network comprises the Internet, the at least one proxy server client comprises a user terminal running a web browser, and the respective local cache is associated with the web browser on the user terminal.

9. A client-server communications network comprising:
a plurality of clients, each client including a local cache for storing data downloaded via the network; and
a server including means for receiving a request for data from a client, means for determining if the request for data can be fulfilled by the server within a predetermined target period, means for sensing a speed of connection with the requesting client, means for varying the predetermined target period based on the sensed speed of connection, and means for sending to the client a proxy list comprising an address of at least one proxy server client which stores requested data in a local cache if the request for data is unable to be fulfilled by the server within the predetermined target period.

10. A network according to claim 9, wherein the server includes means for maintaining a look-up table which correlates items of data with addresses of one or more proxy server clients at which the items of data are cached.

11. A network according to claim 10, wherein the server includes means for receiving cache status change reports from the one or more proxy server clients at which the items of data are cached, and means for updating the look-up table using the cache status change reports.

12. A network according to claim 10, wherein the server includes means for assessing connection speeds to the one or more proxy server clients whose addresses are contained in the look-up table, and means for discarding or demoting the addresses of proxy server clients failing to meet a target connection speed.

13. A network according to claim 9, wherein the server includes means for receiving an address of a proxy server client that provided requested data, and means for assembling an address list of proxy server clients most commonly accessed to obtain requested data.

14. A network according to claim 9, wherein the proxy list comprises addresses of proxy server clients whose workload is below a workload limit.

15. A network according to claim 9, wherein the network comprises the Internet, the plurality of clients comprise user terminals running web browsers, and the respective local caches are associated with the browsers on the user terminals.

16. A server for a client-server communications network, the server comprising:
means for receiving a request for data from a client;
means for determining if the request for data can be fulfilled by the server within a predetermined target period;
means for sensing a speed of connection with the requesting client;
means for varying the predetermined target period based on the sensed speed of connection; and
means for sending to the client a proxy list comprising an address of at least one proxy server client which stores requested data in a local cache if the request for data is unable to be fulfilled by the server within the predetermined target period.

17. A server according to claim 16, further comprising means for maintaining a look-up table which correlates items of data with addresses of one or more proxy server clients at which the items of data are cached.

18. A server according to claim 17, further comprising:
means for receiving cache status change reports from the one or more proxy server clients at which the items of data are cached; and
means for updating the look-up table using the cache status change reports.

19. A server according to claim 17, further comprising:
means for assessing connection speeds to the one or more proxy server clients whose addresses are contained in the look-up table; and
means for discarding or demoting the addresses of proxy server clients failing to meet a target connection speed.

20. A server according to claim 16, further comprising:
means for receiving an address of a proxy server client that provided requested data; and
means for assembling an address list of proxy server clients most commonly accessed to obtain requested data.

21. A server according to claim 16, wherein the proxy list comprises addresses of proxy server clients whose workload is below a workload limit.

22. A server according to claim 16, wherein the network comprises the Internet.

23. A method of a server downloading data via a client-server communications network, the method comprising:
receiving a request for data from a client;
determining if the request for data can be fulfilled by the server within a predetermined period of time; and
sending to the client a proxy list comprising an address of at least one proxy server client which stores requested data in a local cache if the request for data is unable to be fulfilled by the server within the predetermined period of time.

24. A client-server communications network comprising:
a plurality of clients, each client including a local cache for storing data downloaded via the network; and
a server including means for receiving a request for data from a client, means for determining if the request for data can be fulfilled by the server within a predetermined period of time, and means for sending to the client a proxy list comprising an address of at least one proxy server client which stores requested data in a local cache if the request for data is unable to be fulfilled by the server within the predetermined period of time.

25. A server for a client-server communications network, the server comprising:
means for receiving a request for data from a client;
means for determining if the request for data can be fulfilled by the server within a predetermined period of time; and
means for sending to the client a proxy list comprising an address of at least one proxy server client which stores requested data in a local cache if the request for data is unable to be fulfilled by the server within the predetermined period of time.

* * * * *